Patented June 27, 1944

2,352,568

UNITED STATES PATENT OFFICE 2,352,568

COMPOUNDS OF THE SATURATED AND UNSATURATED CYCLOPENTANOPOLYHYDROPHENANTHRENE-SERIES AND DERIVATIVES THEREOF, AND PROCESS OF PREPARING SAME

Tadeus Reichstein, Basel, and Hugo Frey, Olten, Switzerland, assignors to Ciba Pharmaceutical Products Incorporated, Summit, N. J., a corporation of New Jersey No Drawing. Application May 27, 1941, Serial No. 395,484. In Switzerland July 31, 1940

11 Claims. (Cl. 260—397.4)

It has been found that hydroxy aldehydes of the cyclopentanopolyhydrophenanthrene-series or derivatives thereof are obtained by treating saturated or unsaturated compounds of this series which carry in 17-position a substituent of the formula

—CO—CHO in the form of their acetals or mercaptals, with reducing agents, capable of converting the keto group in the side-chain into a carbinol group, transforming any secondary ring-carbinol groups present into keto groups and, if desired, liberating the aldehyde group.

The parent substances for the new process are either known or may be prepared by a method of itself known, for example, from 17-keto, 17-carboxy or 17-acetyl steroids. In addition to the glyoxyl radical in the 17-position, they may carry further substituents, for example, free or esterified hydroxyl and/or keto groups in the known positions for steroids, and may be of any desired steric configuration. Suitable parent materials are, for example, the acetals or mercaptals of the Δ⁵-pregnene-3-ol-20-one-21-als, Δ⁵-pregnene-3,17-diol-20-one-21-als, Δ⁴-pregnene-3,20-dione-21-als, Δ⁴-pregnene-17-ol-3,20-dione-21-als, as well as analogous saturated aldehydes or their derivatives, or such substances which are further substituted, for example, in the 7, 6, 11, or 12 position, with hydroxyl and/or keto groups. The acetals or mercaptals may be prepared by treatment of the corresponding aldehyde, for example, with mono- or polyvalent alcohols in the presence of acids, with o-formic acid esters, o-silicic acid esters or dialkyl sulphites, preferably in the presence of alcohols and acid agents, with formimido ethers, on the one hand, or with mercaptans in the presence of acids on the other. In such circumstances, only the aldehyde group may be converted into the acetal or mercaptal, but keto groups (with the exception of those subjected to steric hindrance in the side-chain) may also be simultaneously converted into analogous derivatives, such as ketals, mercaptals, enol ethers or thioenol ethers. This is particularly to be desired when such keto groups are to be withdrawn from the action of the reducing agents. Furthermore, the acetals and mercaptals are also available by the action of metal alcoholates or metal mercaptides on 21-dihalides.

To convert the keto group in the side-chain into a carbinol group, use is made of the known appropriate chemical, biochemical or electrochemical reducing agents and methods. For example, nascent or catalytically generated hydrogen, the method of exchange of oxidation stages, reaction with organo-metallic compounds which are capable of eliminating unsaturated radicals, may be utilized for this purpose. In cases of necessity, biochemical reduction methods, for example, or a treatment with alcohols in the presence of metal alcoholates or phenolates permit a partial reduction only of the keto group in the side-chain, keto groups in the nucleus remaining unattacked.

Ring-carbinol groups which may be present are now converted, totally or partially, into keto groups by the action of the usual oxidizing or dehydrogenating agents. When a partial oxidation of ring-carbinol groups—but not of the free carbinol group in the side-chain or, if desired, of inert, free, carbinol groups in the nucleus—is to be carried out, the method of exchange of oxidation stages, i. e., the action of a carbinol compound in the presence of a metal alcoholate or phenolate, will be found to be particularly suitable. The partial oxidation may be avoided, however, by first of all allowing esterifying agents to react, so as to convert both free secondary carbinol groups in the ring and those in the side-chain into their esters. If secondary ring-carbinol groups are already present in esterified form, variation of the esterifying agent will yield mixed esters. The same result is obtainable by esterifying the secondary carbinol groups in stages. Hereupon, the esters are subjected to a partial saponification, preferably with alkaline agents in alcohols; this may be accomplished with particularly good yield provided the ring-carbinol groups to be saponified have been esterified with a more readily saponifiable radical than the other carbinol groups, for example, than the already more difficultly saponifiable carbinol group in the side-chain. The free ring-carbinol groups in the compounds thus obtained may now be oxidized or dehydrogenated in a relatively energetic manner, for example, with chromic acid or with permanganates, as the carbinol group in the side-chain has been protected by esterification. In any case, carbon double bonds which may be present may be temporarily protected in cases of necessity in the usual manner, for example, by previous addition and subsequent elimination of halogen or halogen hydride.

Finally, if desired, the aldehyde group is liberated from the acetal or mercaptal compounds by means of agents and methods of themselves known, for example, by acid or neutral agents, such as mineral acids, acid anhydrides, cadmium carbonate, mercury salts and the like.

Before or after the liberation of the aldehyde group, esterifying agents may be allowed to react, if desired, it thus becoming possible to convert free secondary carbinol groups into their esters. If the esterifying takes place before the acetal or mercaptal elimination, it serves as a protection for the sensitive carbinol groups during this elimination.

At any desired reaction stage of the process, a re-acetalization or re-mercaptalization may take place in a manner of itself known. Thus, an acetal or mercaptal, by treatment with another alcohol or mercaptan, particularly with a polyvalent alcohol or mercaptan, for example, in the presence of an acidic agent, is known to be converted readily into the other acetal or mercaptal. Such conversions during the process described are of importance, since it has been observed that the carbonyl group standing in the $\alpha$-position to a mercaptal group is much more difficult to reduce than if it should have an acetal group as its neighbour. On the other hand, the liberation of the aldehyde group may be better regulated at the close of the reaction from a mercaptal compound than from an acetal compound.

By the new process, compounds of the cyclopentanopolyhydrophenanthrene-series are obtained which carry an esterified or unesterified substituent —CHR'—R in the 17-position, R signifying a free, acetalized or mercaptalized aldehyde group and R' a free or esterified hydroxyl group. The process products are highly active compounds of the suprarenal cortical hormone series, or may be converted into such.

Example 1

1 part of $\Delta^5$-pregnene-3-ol-20-one-21-al is boiled under reflux with 20 parts of methanolic hydrochloric acid of 1 percent strength for one hour. An excess of aqueous soda solution is added, the methyl alcohol is removed by vaccum distillation and the residue is extracted with ether. The ethereal solution is washed with water, dried with sodium sulphate and evaporated. The residue is sublimed in high vacuum at about 150° C., and the sublimate is re-crystallized from a mixture of ether and hexane. Colorless crystals are thus obtained. They are the dimethyl acetal of the aldehyde used and have a melting point of 112–113° C.

In an analogous manner the dibenzyl mercaptal, melting point 142–143° C., is obtained by reacting, for example, with benzyl mercaptan and hydrochloric acid.

1 part of $\Delta^5$-pregnene-3-ol-20-one-21-al-dimethylacetal is dried by evaporation with 8 parts of toluene in vacuo. After addition of 1 part of aluminium isopropylate and 10 parts of absolute isopropyl alcohol, the reaction mixture is slowly distilled in a small retort, further quantities of isopropyl alcohol being allowed to drop into the mixture so that, after about 19 hours, the same volume of reaction solution still remains and a total quantity of about 20 parts of solvent have been distilled. In the early stages of the reaction, the distillate contains much acetone, but the latter portions are acetone-free (nitroprusside reaction). When the reaction is complete, the isopropyl alcohol is removed in vacuo and a large quantity of ether is added to the residue. The ethereal solution is shaken 4 times with a mixture of 10 parts each of saturated aqueous Seignette salt solution and 1 part saturated aqueous sodium bicarbonate solution 3 times, further with water, and then the aqueous portions are extracted twice with ether. On evaporation of the ether solution, previously dried with sodium sulphate, almost colorless needles are left as residue. After twice re-crystallizing, these melt at 132° C. This $\Delta^5$-pregnene-3, 20-diol-21-al-dimethylacetal may also be purified by chromatographing with aluminium oxide, in which case it is extracted with benzene-ether. The pure diol then melts at 132.5–133.5° C. It is sparingly soluble in acetone, ether and benzene. If, for the purpose of analysis, the substance be dried, for example, for 15 hours in a high vacuum at 75° C. over phosphorus pentoxide, values are obtained which indicate the presence of 1 molecule of water of crystallization. After sublimation in a high vacuum at 130° C., analyses are obtained which correspond to the dehydrated product. This $\alpha$-hydroxy-aldehyde-acetal, in contrast to the parent material, gives a beautiful red coloration when warmed with 1,4-dihydroxy-naphthalene in glacial acetic acid-hydrochloric acid.

In an analogous manner, for example, the acetals or mercaptals of $\Delta^5$-pregnene-3,17,20-triol-21-al may be obtained. If $\Delta^4$-pregnene-3,20-dione-21-al or $\Delta^4$-pregnene-17-ol-3,20-dione-21-al be used as parent material, the 20-hydroxy compounds, which may subsequently be hydrolyzed to the corresponding 3-keto-20-hydroxy-21-aldehydes, are obtained, preferably by way of the corresponding 3-enolether-21-acetals or 3-thioenolether-21-mercaptals.

Example 2

150 parts of absolute toluene are added to 1 part of $\Delta^5$-pregnene-3,20-diol-21-al-dimethylacetal and, in order to dry the mixture, 75 parts of the solvent are distilled under a low vacuum. 1 part of aluminium isopropylate, together with 10 parts of cyclohexanone, are added to the residue, and the reaction mixture is boiled under calcium chloride seal and reflux for 1¼ hours. The reaction mixture is subjected to steam distillation for 1½ hours; the precipitated crude product is removed by filtering with suction after acidifying, and, after drying, it is extracted with ether. The ethereal solution is evaporated and the residue is recrystallized from petroleum ether. In this manner, $\Delta^4$-pregnene-3-one-20-ol-21-al-dimethylacetal, of melting point 132–133° C., is obtained.

Its constitution is to be verified by the formation of a mono-semicarbazone, which melts with decomposition at about 213–215° C., also from the formation of mono-esters, such as a mono-acetate, propionatebenzoate, and the like, and from the ultraviolet spectrum, which shows the characteristic absorption bands for an $\alpha,\beta$-unsaturated ketone at 2400 Å. In admixture with the parent substance, the new product shows a strong depression of the melting point of about 30° and yields, like the parent material, a positive reaction (red coloration) with 1,4-dihydroxynaphthalene in glacial acetic acid-hydrochloric acid.

By reaction, for example, with mineral acids in aqueous acetic acid, the $\alpha$-hydroxy-acetal or its esters described may be split up to yield $\Delta^4$-pregnene-3-one-20-ol-21-al or its esters. The reaction takes place particularly smoothly if an acetal having a higher or a secondary alcohol, or a mercaptal be used as parent material. Such derivatives may be obtained by simple re-acetalization or re-mercaptalization in known manner at any desired stage of the process. The free α-hydroxy aldehyde may be converted into its esters, for example, into its acetate, propionate, butyrate, palmitate, benzoate, etc., by the action of esterifying agents, such as acid anhydrides, halides and diazo compounds.

If, for example, the acetals or mercaptals of Δ⁵-pregnene-3,17,20-triol-21-al, Δ⁵-pregnene-3,11,20-triol-21-al or similar additionally substituted compounds be used as parent materials, Δ⁴-pregnene-3-one-17,20-diol-21-al, Δ⁴-pregnene-3-one-11,20-diol-21-al or similarly substituted aldehydes or their esters, for example, may be obtained by analogous partial oxidation and subsequent splitting.

*Example 3*

10 parts of acetic anhydride are added to the solution of 1 part of Δ⁵-pregnene-3,20-diol-21-al-dimethylacetal in 50 parts of pyridine, previously cooled to −10° C., and the reaction mixture is left to stand for 40 hours at the same temperature, after which it is poured into a large quantity of water, and the precipitated acetylation product is filtered off at the pump after being allowed to stand for a time. It is then taken up in petroleum ether and is chromatographed through a column of aluminium oxide which has previously been prepared with the same solvent. In such circumstances, an extract is obtained by means of benzene which melts at about 180° C. Later, by use of ether, an extract having a melting point of 120° C. is yielded. The former products, on recrystallization from petroleum ether, yield Δ⁵-pregnene-3,20-diol-diacetate-21-al-dimethylacetal, melting at 186° C.; the latter yield Δ⁵-pregnene-3,20-diol-3-monoacetate-21-al-dimethylacetal, melting at 122° C. The same compounds may be obtained by acetylation at room temperature. The monoacetate may be converted into the diacetate by energetic acetylation.

4.62 parts of the diacetate are dissolved in 800 parts of methanol, a solution of 0.56 part of potassium hydroxide in a little methanol is added and the whole is stirred for 30 hours at 15° C. The reaction mixture is now neutralized cautiously with dilute hydrochloric acid and, after the solution has been concentrated in vacuo, the concentrate is poured into water. The product of the reaction is filtered at the pump, dried, recrystallized from hexane, and in this manner Δ⁵-pregnene-3,20-diol-20-monoacetate-21-al-dimethylacetal is obtained. This compound gives a sharp lowering of the melting point when mixed with the 3-monoacetate described above. If work is carried out in higher alcohols, such as ethanol, propanol or butanol, when partially saponifying, the necessary reaction time is appreciably reduced.

The 20-monoacetate is dissolved in glacial acetic acid and the calculated quantity of a solution of bromine in glacial acetic acid is dropped into the solution, followed by a 50 percent excess of chromic acid solution in glacial acetic acid of 30 percent strength. After standing for 16 hours at room temperature, the reaction mixture is poured into water, and the precipitated ketone, which contains bromine, is filtered at the pump and washed with water. In order to remove the bromine it is dissolved in glacial acetic acid, zinc dust is added and the reaction mixture is stirred strongly for 10 minutes on the boiling water bath. The solution is then filtered at the pump, when the filtrate is poured into water, extracted with ether and the ethereal solution is washed with water, soda solution and again with water. It is then dried and evaporated in vacuo. The crude product is sublimed in a high vacuum or purified by chromatography and yields the Δ⁴-pregnene-3-one-20-ol-acetate-21-al-dimethylacetal described in Example 2. The dehalogenation may also be carried out, for example, by the action of an alkaline iodide in alcoholic solution.

This acetal, as described in Example 2, may be split up to yield the corresponding α-acetoxyaldehyde.

What we claim is:

1. A process for the manufacture of hydroxyaldehydes of the saturated and unsaturated cyclopentanopolyhydrophenanthrene-series and the derivatives thereof, which comprises treating compounds of the said series, containing in 17-position a substituent of the formula

—CO—R

wherein R is a member of the group consisting of an acetalized and a mercaptalized aldehyde group, with a reducing agent capable of converting the keto group in 20-position in the side-chain into a carbinol group and selected from the group consisting of nascent hydrogen, catalytically generated hydrogen, and a metal alcoholate and alcohol, and transforming secondary nuclear carbinol groups present into keto groups.

2. A process for the manufacture of hydroxyaldehydes of the saturated and unsaturated cyclopentanopolyhydrophenanthrene-series and the derivatives thereof, which comprises treating compounds of the said series, containing in 17-position a substituent of the formula

—CO—R

wherein R is a member of the group consisting of an acetalized and a mercaptalized aldehyde group, with a reducing agent capable of converting the keto group in 20-position in the side-chain into a carbinol group and selected from the group consisting of nascent hydrogen, catalytically generated hydrogen, and a metal alcoholate and alcohol, transforming secondary nuclear carbinol groups present into keto groups and liberating the aldehyde group.

3. A process for the manufacture of hydroxyaldehydes of the saturated and unsaturated cyclopentanopolyhydrophenanthrene-series and the derivatives thereof, which comprises treating compounds of the said series, containing in 17-position a substituent of the formula

—CO—R

wherein R is a member of the group consisting of an acetalized and a mercaptalized aldehyde group, with a reducing agent capable of converting the keto group in 20-position in the side-chain into a carbinol group and selected from the group consisting of nascent hydrogen, catalytically generated hydrogen, and a metal alcoholate and alcohol, then esterifying the said carbinol group as well as secondary nuclear carbinol groups present with esterifying agents, subjecting polyesters thus obtained to a partial saponification with the aid of hydrolyzing agents, transforming secondary nuclear carbinol groups present into keto groups, and liberating the aldehyde group.

4. A process for the manufacture of hydroxyaldehydes of the saturated and unsaturated cyclopentanopolyhydrophenanthrene-series and the derivatives thereof, which comprises treating compounds of the said series, containing in 17-position a substituent of the formula

—CO—R wherein R is a member of the group consisting of an acetalized and a mercaptalized aldehyde group, with a reducing agent capable of converting the keto group in 20-position in the sidechain into a carbinol group and selected from the group consisting of nascent hydrogen, catalytically generated hydrogen, and a metal alcoholate and alcohol, then esterifying the said carbinol group as well as secondary nuclear carbinol groups present with esterifying agents, subjecting polyesters thus obtained to a partial saponification with the aid of hydrolyzing agents, transforming secondary nuclear carbinol groups present into keto groups with the aid of oxidizing agents, double bonds being temporarily protected, and liberating the aldehyde group.

5. A process for the manufacture of hydroxy-aldehydes of the saturated and unsaturated cyclopentanopolyhydrophenanthrene-series and the derivatives thereof, which comprises treating compounds of the said series, containing in 17-position a substituent of the formula

—CO—R wherein R is a member of the group consisting of an acetalized and a mercaptalized aldehyde group, with a reducing agent capable of converting the keto group in 20-position in the sidechain into a carbinol group and selected from the group consisting of nascent hydrogen, catalytically generated hydrogen, and a metal alcoholate and alcohol, transforming secondary nuclear carbinol groups present into keto groups with the aid of dehydrogenating agents, and liberating the aldehyde group.

6. A process for the manufacture of hydroxy-aldehydes of the saturated and unsaturated cyclopentanopolyhydrophenanthrene-series and the derivatives thereof, which comprises treating compounds of the said series, containing in 17-position a substituent of the formula

—CO—R wherein R is a member of the group consisting of an acetalized and a mercaptalized aldehyde group, with a reducing agent capable of converting the keto group in 20-position in the sidechain into a carbinol group and selected from the group consisting of nascent hydrogen, catalytically generated hydrogen, and a metal alcoholate and alcohol, transforming secondary nuclear carbinol groups present into keto groups with the aid of dehydrogenating agents, treating the compounds thus obtained with esterifying agents and liberating the aldehyde group.

7. A process for the manufacture of hydroxy-aldehydes of the saturated and unsaturated cyclopentanopolyhydrophenanthrene-series and the derivatives thereof, which comprises treating compounds of the said series, containing in 17-position a substituent of the formula

—CO—R wherein R is a member of the group consisting of an acetalized and a mercaptalized aldehyde group, with a reducing agent capable of converting the keto group in 20-position in the sidechain into a carbinol group, transforming secondary nuclear carbinol groups present into keto groups with the aid of dehydrogenating agents, liberating the aldehyde group and treating the compounds thus obtained with esterifying agents.

8. The compounds of the saturated and unsaturated cyclopentanopolyhydrophenanthrene-series and the derivatives thereof, containing in 17-position a substituent of the formula $$-\underset{\underset{\text{R}'}{|}}{\text{C}}\text{H}-\text{R}$$

wherein R is a member of the group consisting of an acetalized and a mercaptalized aldehyde group and R' is a member of the group consisting of a free and esterified hydroxyl group.

9. The Δ⁵-pregnene-3,20-diol-21-al-dimethylacetals of the formula

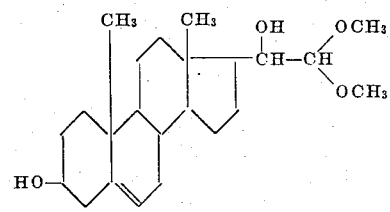

10. The Δ⁴ - pregnene - 3 - one-20-ol-21-al-dimethylacetals of the formula

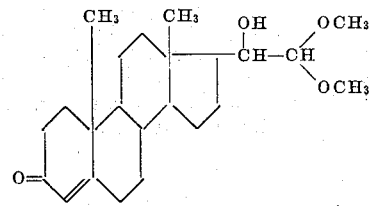

11. The Δ⁵-pregnene-3,20-diol-diacetate-21-al-dimethylacetals of the formula

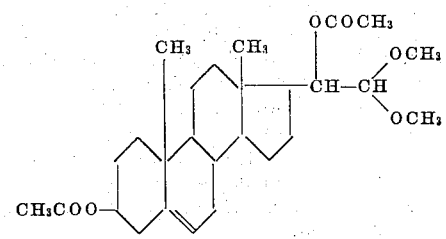

TADEUS REICHSTEIN.
HUGO FREY.